US008327962B2

(12) United States Patent
Bergmeier et al.

(10) Patent No.: US 8,327,962 B2
(45) Date of Patent: Dec. 11, 2012

(54) ELECTRIC VEHICLE, IN PARTICULAR INDUSTRIAL TRUCK WITH A BATTERY SECURING MEANS

(75) Inventors: Stefan Bergmeier, Langenpreising (DE); Carsten Schöttke, Moosburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 255 days.

(21) Appl. No.: 12/745,591

(22) PCT Filed: Nov. 28, 2008

(86) PCT No.: PCT/EP2008/010127
§ 371 (c)(1),
(2), (4) Date: Jun. 25, 2010

(87) PCT Pub. No.: WO2009/068304
PCT Pub. Date: Jun. 4, 2009

(65) Prior Publication Data
US 2010/0300784 A1    Dec. 2, 2010

(30) Foreign Application Priority Data

Nov. 30, 2007   (DE) .......................... 10 2007 057 801

(51) Int. Cl.
*B60R 16/04*      (2006.01)
*B62M 6/90*       (2010.01)
*A47B 96/00*      (2006.01)
*B65D 43/14*      (2006.01)
*B65D 45/16*      (2006.01)

(52) U.S. Cl. ............... 180/68.5; 180/207.3; 248/221.11; 220/833; 220/834; 220/324

(58) Field of Classification Search ................. 180/68.5, 180/207.3; 248/221.11, 222.11, 222.12; 220/833, 834, 324, 326
See application file for complete search history.

(56) References Cited

U.S. PATENT DOCUMENTS
3,179,200 A * 4/1965 Hoyt ........................... 180/68.5
(Continued)

FOREIGN PATENT DOCUMENTS
CN          2897703 Y      5/2007
(Continued)

OTHER PUBLICATIONS

Translation of Chinese Office Action in the corresponding Application No. 200880123502.6 issued on Aug. 6, 2012, 4 pages.

*Primary Examiner* — J. Allen Shriver, II
*Assistant Examiner* — James M Dolak
(74) *Attorney, Agent, or Firm* — Rothwell, Figg, Ernst & Manbeck, P.C.

(57) ABSTRACT

The invention relates to an electric vehicle, especially an industrial truck comprising at least one securing brace (28) for a battery block (24) that is accommodated in the vehicle (10). The securing brace (28) encompasses an engaging section (30) that can be inserted into a first frame part (34) of the vehicle (10), a fastening element (38, 56) that can be hooked into a second frame part (40), and a retaining section (44) that extends therebetween. A supporting section (70) of the securing brace (28) at least partly rests against the battery block (24) in a securing position in which the securing brace (28) is inserted in the vehicle. Said supporting section (70) of the securing brace (28) is located in the area of the retaining section (44) or in the area of the transition between the retaining section (44) and the engaging section (30) and forms a bearing of the securing brace (28) on the battery block (24) such that the fastening element (38) can be hooked into the second frame part (40) while the retaining section (44) is elastically deformed and the engaging section (30) is in the inserted state in the first frame part (34).

25 Claims, 8 Drawing Sheets

U.S. PATENT DOCUMENTS

| | | | |
|---|---|---|---|
| 4,355,695 A * | 10/1982 | Leskovec | 180/68.5 |
| 4,991,674 A * | 2/1991 | Fullenkamp | 180/68.5 |
| 6,564,893 B2 * | 5/2003 | Lipman | 180/68.5 |
| 6,732,825 B2 * | 5/2004 | Takeda | 180/68.5 |
| 7,070,225 B2 * | 7/2006 | Herrmann | 296/146.6 |
| 7,398,848 B2 * | 7/2008 | Kondo | 180/68.5 |
| 7,810,597 B2 * | 10/2010 | Imashige | 180/69.2 |
| 7,984,779 B2 * | 7/2011 | Boegelein et al. | 180/68.5 |
| 8,196,690 B2 * | 6/2012 | Kunkel et al. | 180/68.5 |
| 2005/0092536 A1 * | 5/2005 | Takeda | 180/68.5 |
| 2006/0070780 A1 * | 4/2006 | Lin | 180/68.5 |

FOREIGN PATENT DOCUMENTS

| | | |
|---|---|---|
| DE | 31 27 019 C2 | 4/1984 |
| DE | 195 46 556 C1 | 11/1996 |
| DE | 196 22 694 A1 | 12/1997 |
| DE | 101 59 555 A1 | 6/2003 |
| DE | 10 2004 047339 A1 | 3/2006 |
| DE | 10 2006 016801 A1 | 10/2007 |
| EP | 1 205 424 A | 5/2002 |
| EP | 1595841 A2 | 11/2005 |
| EP | 1 803 680 A1 | 7/2007 |

* cited by examiner

ELECTRIC VEHICLE, IN PARTICULAR INDUSTRIAL TRUCK WITH A BATTERY SECURING MEANS

CROSS REFERENCE TO RELATED APPLICATION

This application is a 35 U.S.C. 371 National Phase Entry Application from PCT/EP2008/010127, filed Nov. 28, 2008, which claims the benefit of German Patent Application No. 10 2007 057 801.8 filed on Nov. 30, 2007, the disclosures of which are incorporated herein in their entirety by reference.

The present invention relates to an electric vehicle, in particular an industrial truck with a securing device for a battery pack accommodated in the vehicle in order to secure the battery pack to prevent it from being displaced within a battery accommodating compartment during operation of the vehicle.

Known battery securing means which are used in industrial trucks generally have a pivotable lever, which is arranged on one side of the vehicle and which can be pivoted from an opening position into a securing position in order to make it possible to introduce or remove a battery pack into or from a battery accommodating compartment and in order to secure the battery pack to prevent a lateral movement during operation. Such lever constructions require a relatively large amount of space within the vehicle housing in order to have the required stability which is necessary for securing the very heavy battery pack.

The object of the invention is to provide a battery securing means which requires less physical space.

In order to achieve this object, the invention proposes an electric vehicle, in particular an industrial truck comprising at least one securing bracket for a battery pack accommodated in the vehicle, the securing bracket comprising an engagement section, which can be inserted into a first frame part of the vehicle, a fastening element, which can be suspended in a second frame part, and a holding section which extends between said engagement section and said fastening element, the securing bracket, in a securing position in which it has been inserted in the vehicle, bearing with a supporting region at least partially against the battery pack, and the supporting region of the securing bracket being located in the region of the holding section or in the region of the transition between the holding section and the engagement section and forming a support for the securing bracket on the battery pack, in such a way that, when the engagement section is introduced into the first frame part, the fastening element can be suspended in the second frame part with elastic deformation of the holding section.

Such a securing bracket is arranged to the side of the battery pack and extends between an outer side of the battery pack and an inner side of a covering plate, which is or can be fastened on the vehicle frame and with which the battery accommodating compartment can be closed. The physical space required by the securing bracket is therefore restricted to the interspace which is provided between the battery pack and the cover plate and is generally not used. It is therefore not necessary for more physical space to be used, going into the battery compartment, i.e. in a transverse direction with respect to a main direction of travel of the vehicle.

Preferably, the securing bracket is designed in such a way that, in the securing position, it exerts a tensioning force which acts on the battery pack in the supporting region. By virtue of this tensioning force, the battery pack is held fixedly in the accommodating compartment, and at the same time this tensioning force results in the engagement section being pressed or braced against the first frame part and the fastening element being pressed or braced against the second frame part, which ensures that the securing bracket cannot be released either from the first frame part or from the second frame part during operation of the vehicle.

In order to be able to manually remove the securing bracket, the invention proposes that the securing bracket is designed in such a way that it can be brought out of engagement with at least one of the frame parts, preferably the second frame part, counter to the pretensioning force acting in the securing position. The counterforce to the pretensioning which is acting, which counterforce needs to be exerted for this purpose on the securing bracket by an operator, is critically determined on the basis of the lever arm ratio between the fastening element, the holding section and the engagement section. If the supporting region in which the securing bracket bears against the battery pack is selected to be as far away from the fastening element as possible, there results a good lever arm for manual actuation, by means of which lever arm a high tensioning force is produced in the supporting region of the securing bracket with a relatively low manual amount of force being exerted on the fastening element, and this high tensioning force can be transferred to the battery pack.

It is particularly advantageous if in the securing position, the securing bracket extends in the substantially vertical direction from the first, lower frame part to the second, upper frame part of the vehicle, the lower and the upper frame part delimiting an opening in an accommodating compartment for the battery pack in the vertical direction. It is possible with such an arrangement for a force to be exerted manually for suspending the securing bracket in the securing position or for releasing said securing bracket from this securing position at a height which is optimum for an operator, namely in a range of approximately 80-120 cm above the ground. In addition, by virtue of the substantial vertical alignment of the securing bracket, it is possible to achieve a maximum lever arm ratio since the battery packs to be secured generally have a vertical height which is greater than their horizontal width. However, it is also perfectly conceivable that such a securing bracket runs substantially horizontally and can therefore be introduced, for example with its engagement section, into a first, front frame part of the vehicle and can be suspended or latched with its fastening element into a second, rear frame part.

Preferably, the engagement section is in the form of a lug, which is designed to be integral with the holding section, wherein it is particularly preferred that the lug is bent back with respect to the holding section, preferably in a direction away from the battery pack with respect to the securing position. Such a configuration results in a bend in the transition between the engagement section and the holding section, which bend is directed with its convex side towards the battery pack in the securing position and acts as a supporting region on the battery pack if the fastening section is suspended in the second, upper frame part.

Preferably, the fastening element is fastened adjustably on the holding section in such a way that the distance between a section of the fastening element, said section being capable of being suspended in the second, upper frame part, and the holding section is variable. Such an adjustability makes it possible to use the securing bracket for different types of vehicle with different battery packs. In addition, by virtue of the adjustability of the fastening element relative to the holding section, the manual force which is required for suspending or removing the fastening element in or from the second frame part can be influenced, and therefore also the tensioning force acting on the battery pack.

The fastening element can be arranged on a fastening tongue of the holding section, the fastening tongue protruding from the holding section with respect to the securing position in the direction of the battery pack.

It is particularly preferred that the fastening tongue and/or the fastening element have a slot, through which a screw arrangement, in particular a screw-and-nut arrangement, which connects the fastening tongue and the fastening element to one another, passes and which is designed in such a way that the fastening element is adjustable along the fastening tongue when the screw arrangement has been released. The fastening tongue can run at an angle relative to the holding section, with the result that, in the event of a relative displacement between the fastening element and the fastening tongue, a vertical movement component is also contained, by virtue of which the fastening element can also be adjusted with respect to its height relative to the lower frame part.

In the securing position it is preferable that the suspendable section of the fastening element extends in the substantially vertical direction. In this case, the suspendable section can be introduced into a cutout in the second, upper frame part, and in the securing position, engages behind a hook-like projection, which delimits the cutout on one side.

In this arrangement, the fastening element is introduced with its suspendable section into the cutout in the upper frame part by virtue of a pivoting movement towards the battery pack and is suspended or latched in or on the hook-like projection of the frame part by virtue of a slight sidewards movement and a subsequent movement away from the battery pack. In this case, the hook is designed in such a way that the fastening element or its suspendable section can only be moved away from the hook in the direction towards the battery pack, which is only possible by virtue of the application of the manual force mentioned above, which overcomes the pretensioning force which is acting when the securing bracket is correctly inserted.

In order to prevent the securing bracket from sliding out in the vertical direction, the invention proposes that a distance between the screw arrangement (54) and the underside of the second, upper frame part (40) is selected in such a way that no, or only a slight, vertical movement of the securing bracket is made possible. The stop which is therefore formed between the screw arrangement and the frame component prevents the lug of the securing bracket from sliding out of the receptacle in the lower frame part.

In order to further improve the adaptability to other vehicle types and different battery pack sizes, the invention proposes that the securing bracket comprises, on the side thereof which faces the battery pack in the securing position, an in particular elastic adapter element which is in contact with the battery pack.

In this context, it is particularly preferred that the adapter element is fastened releasably on the holding section above the lower engagement section, wherein the adapter element is fastened adjustably by a screw arrangement, which extends through a slot formed in the holding section. This vertical adjustability of the adapter element likewise has implications for the lever forces acting when the securing bracket is suspended and therefore also for the tensioning forces acting on the battery pack.

If an adapter element is provided, said adapter element preferably forms the supporting region of the securing bracket on the battery pack. The adapter element can therefore be considered to be a support in order to make it possible for that part of the securing bracket which is located above the adapter element to be pivoted elastically and then to be suspended on the second frame part.

In order to simplify the application of manual forces during suspension or removal of the securing bracket, the fastening element can have an in particular pivotable actuating handle, wherein, in the case of pivotability, the actuating handle can be pivoted between an actuating position and a rest position. In this case, the actuating handle extends substantially in the vertical direction in its actuating position and is folded downwards towards the fastening tongue of the holding section in its rest position, with the result that the vertical space requirement is kept to a minimum.

Preferably, the holding section of the securing bracket has a Y shape, with the two upper limbs of the holding section being connected to one another by a transversely running web, on which the fastening element is supported.

In accordance with a particularly advantageous embodiment, the securing bracket can be designed in such a way that a cover of the accommodating compartment for the battery pack can be fastened on the securing bracket. In the securing position, the securing bracket therefore has an advantageous, combined function, namely acts firstly as a securing means for the battery pack and secondary as a component supported on the vehicle frame, with the battery compartment cover being capable of being fitted easily on said component. In addition, this type of construction also ensures that the cover cannot be attached to the vehicle without the securing bracket having being correctly inserted, with the result that an increased degree of safety is ensured since a battery compartment without a securing bracket cannot be closed by the cover. Preferably, the cover can be fastened, in the region of the lower edge thereof, in the first, lower frame part and can be fastened, in the region of the upper edge thereof, on the securing bracket.

In order to make it possible to fasten the cover on the securing bracket, the invention proposes that the two upper limbs of the Y-shaped holding section are each bent toward the battery pack with respect to the securing position and comprise accommodating means for fastening the cover. These accommodating means may be, for example, L-shaped metal profiles with an opening, into which a corresponding mating piece of the cover can be suspended or latched.

In order to further increase safety for operation and to make it possible to bring a vehicle into operation only when the battery pack is correctly secured, a sensor can be provided, by means of which the presence or the correct attachment of the at least one securing bracket in the securing position can be verified. In this case, the sensor can transmit a corresponding battery secure signal to an electronic control unit of the electric vehicle, with the result that information relating to the battery secure state can be output by the control unit by means of an associated, in particular optical and/or acoustic interface.

If, in the case of an electric vehicle, the battery accommodating compartment is accessible from both sides of the vehicle, the invention proposes that the vehicle comprises two securing brackets with one securing bracket being attachable or attached to each side of the accommodating compartment for the battery pack. When a battery pack is introduced into such an accommodating compartment, for example, in this case one side is secured by a first securing bracket which has already been inserted, and the battery pack is introduced, in particular rolled into the battery accommodating compartment from the other side, which is still open, until it bears against the first securing bracket. Then, the second securing bracket can be introduced into the first frame part and can then be suspended in the second frame part by virtue of the application of a manual force, with the result that the battery pack is clamped between the two securing brackets in the battery accommodating compartment and is secured against lateral movement.

One embodiment of the invention will be described below by way of example and in nonrestrictive fashion with reference to the attached figures, in which.

Figure 1:
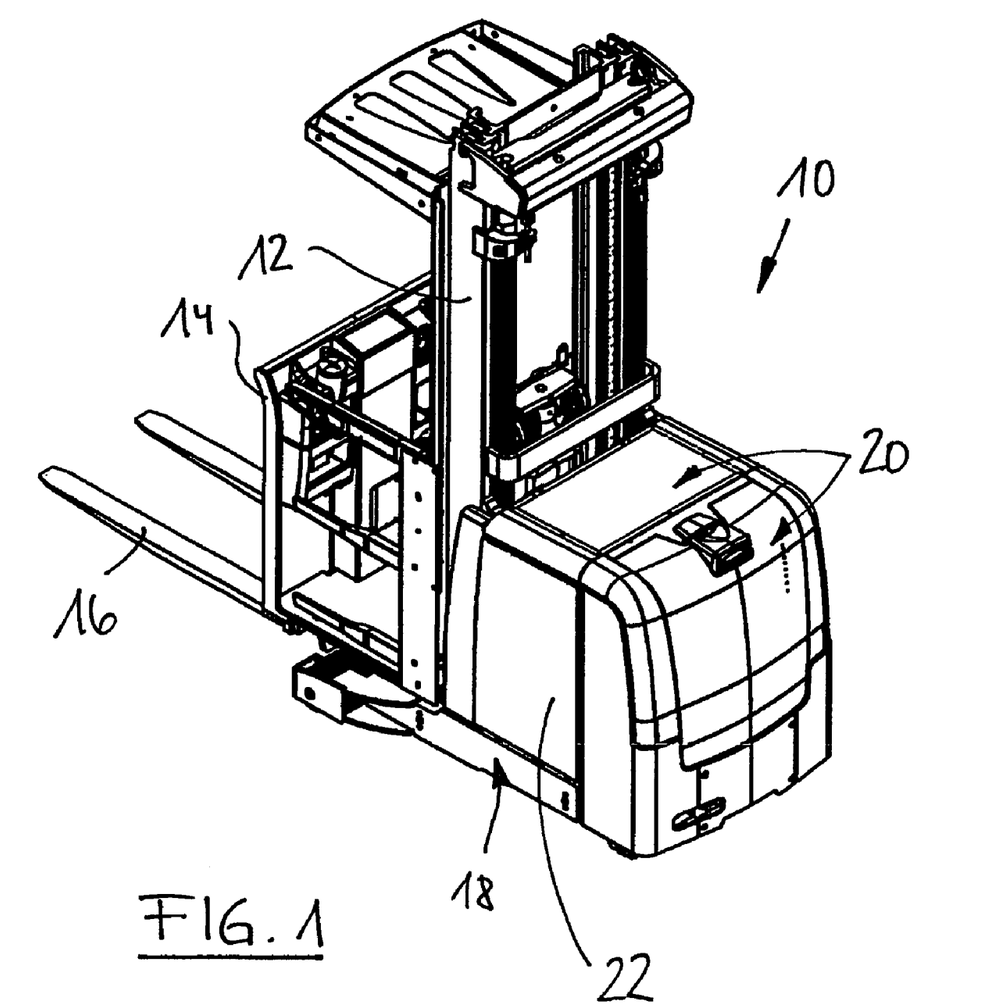
FIG. 1 shows a schematic, perspective view of an industrial truck, which is equipped with an embodiment of the securing bracket.

FIG. 1 shows a schematic, perspective illustration of an industrial truck in the form of an order picker 10, which comprises the known main parts, namely the lifting mast 12, the driver's cab 14 which can be raised vertically, the load pickup fork 16, the vehicle frame 18 and a housing 20, which surrounds a battery pack and the electrical drive and the hydraulic pumps.

Figure 2:
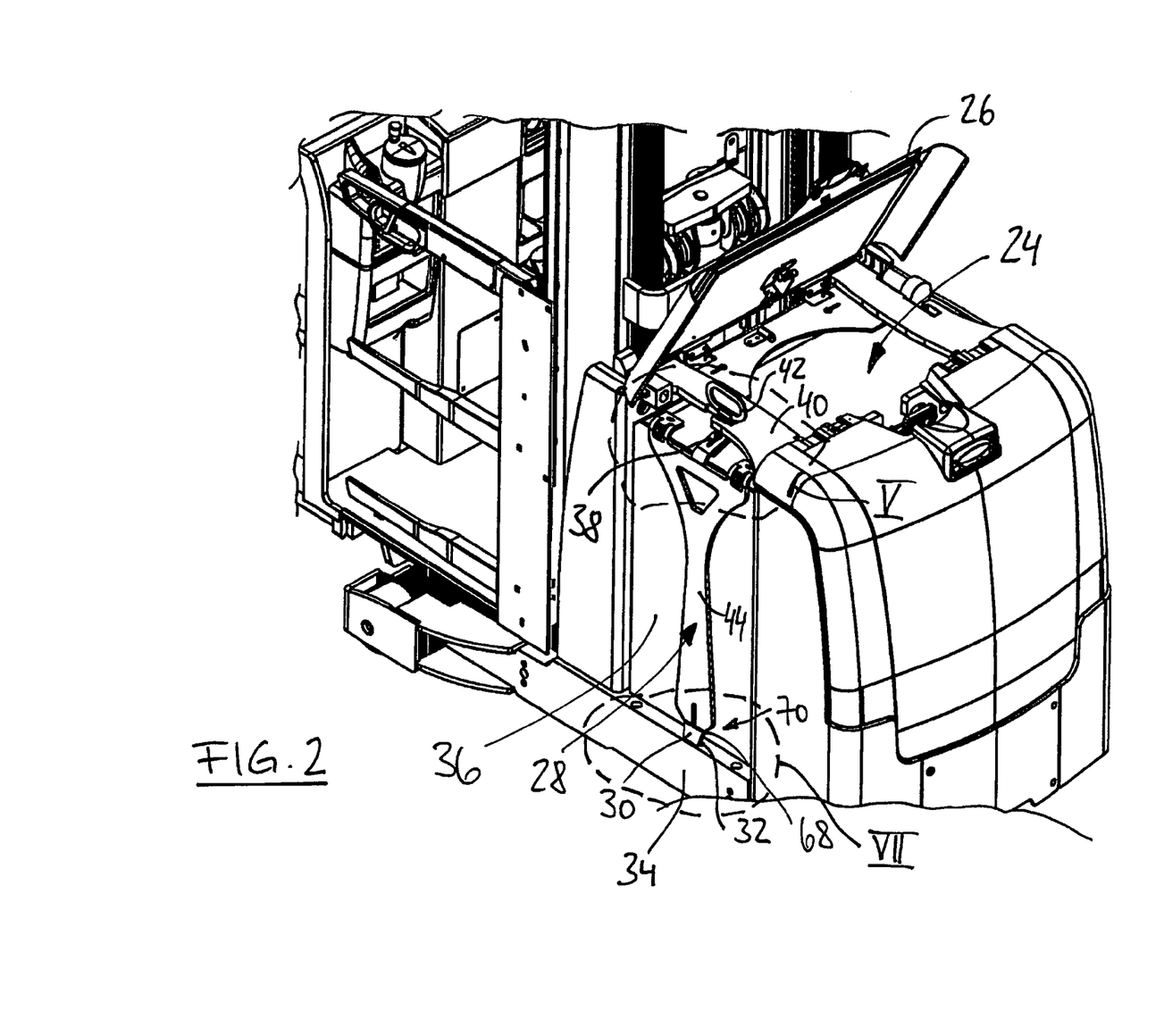
FIG. 2 shows an enlarged, perspective partial view of the industrial truck, with the view of a battery pack and the securing bracket being shown.

A lateral cover 22 closes a battery accommodating compartment, which is accessible from the side and in which the battery pack 24 is accommodated (FIG. 2). In FIG. 2, the lateral cover 22 has been removed and an upper cover 26 has been pivoted upwards, with the result that the view of the battery pack 24 and a securing bracket 28, which secures the battery pack 24 to prevent it from falling out laterally, is shown. The securing bracket is inserted with a lug 30 into a receptacle 32 of a lower frame part 34 and extends substantially in the vertical direction along a side wall 36 of the battery pack 24 upwards, wherein it is suspended with a fastening element 38 on an upper frame part 40. The fastening element 38 has a bracket 42, which has been pivoted into its actuation position in FIG. 2 and which an operator can grip when inserting or removing the securing bracket 28. Reference is made to the fact that such a securing bracket 28 can also be arranged on the other side of the industrial truck 10, even though this is not illustrated in FIG. 2.

Figure 3:
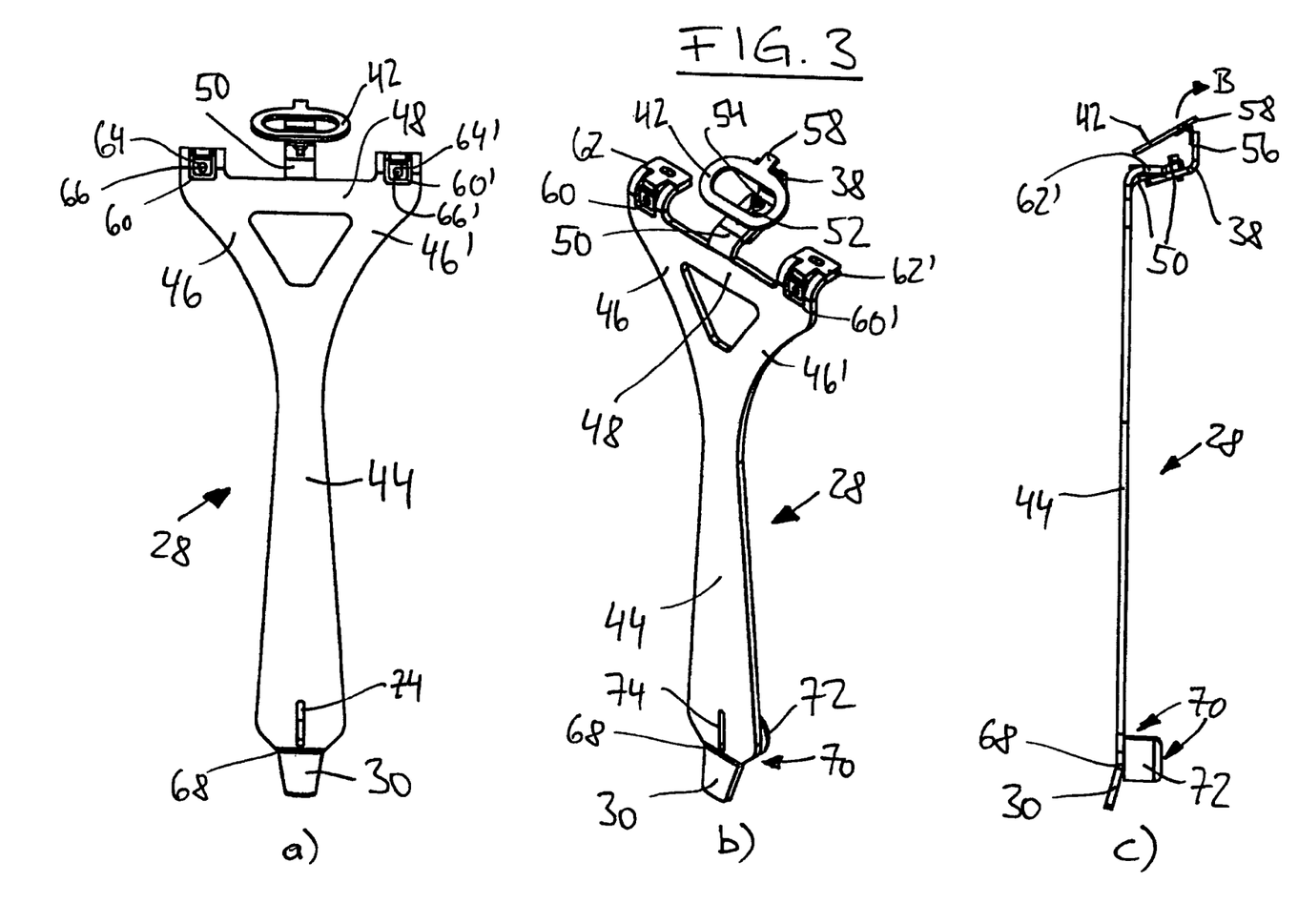
FIGS. 3*a-c* are different schematic views of the securing bracket.
Figure 4:
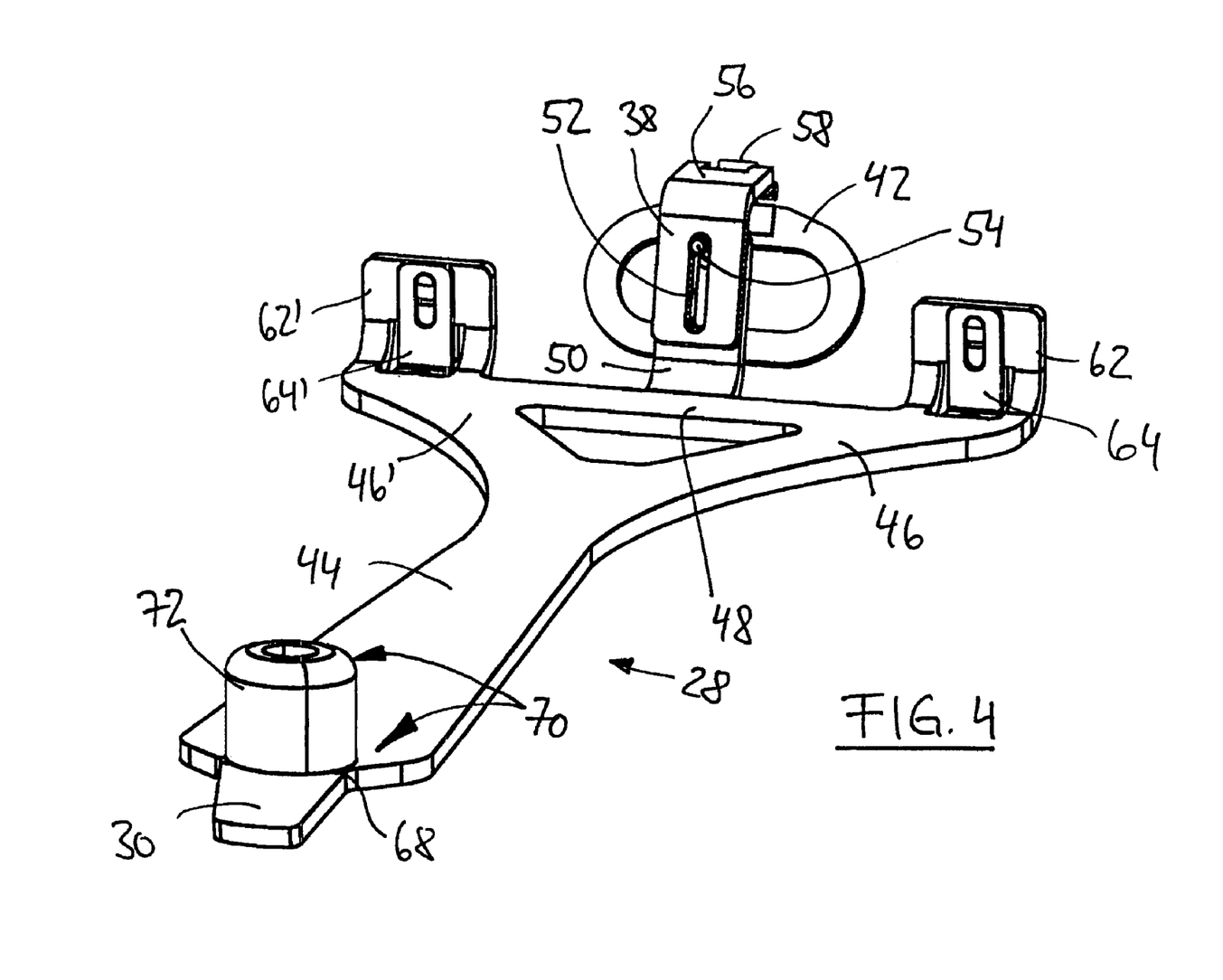
FIG. 4 shows an enlarged, schematic, perspective view of the securing bracket on the side facing the battery pack.

The securing bracket will now be explained in detail with reference to FIGS. 3 and 4. In its lower region, the securing bracket 28 has the lug 30, which can be plugged into the lower frame part 34 of the industrial truck. The lug 30 is adjoined at the top by a holding section 44, which substantially has the shape of a Y, wherein the two upper limbs 46, 46' are connected to one another via a horizontally running web 48. A bent and sloping fastening tongue 50, to which the fastening element 38 is attached, extends in the center of the horizontal web 48. In each case one slot 52 is formed in the fastening tongue 50 and in the fastening element 38, through which slot a screw arrangement 54 passes for fastening the fastening element 38 to the fastening tongue 50. By virtue of the slots 52 and the screw arrangement 54, the fastening element 38 can be displaced along the fastening tongue 50, with the result that the position of a section 56, which is suspended on the frame part 40, of the fastening element 38 can be matched to different battery pack sizes or different frames of different industrial trucks. The actuating bracket 42, which is illustrated in its rest position in FIG. 3, is attached pivotably to the fastening element 38. In order to attach the securing bracket 28 to the industrial truck or to remove said securing bracket therefrom, the actuating bracket 42 is pivoted upwards in the direction of the arrow B until it bears with a pin 58 on the suspension section 56 of the fastening element 38 and is aligned substantially in the vertical direction (see FIG. 2).

The two limbs 46, 46' are bent at their respective upper ends through approximately 90° and have an opening 60, 60' which is cut out in the bend region. Respective L-shaped profiled pieces 64, 64' are attached to the bent sections 62, 62' and have a respective opening 66, 66', which are used for fastening the cover 22, which will be described in more detail below with reference to FIGS. 8 and 9.

The lug 30 and the holding section 44 are angled with respect to one another, with the result that a kink or a bend 68 is formed therebetween. If the securing bracket 28 has been attached to the industrial truck in its correct securing position (see FIG. 2), a supporting region 70, with which the securing bracket 28 is in contact on the side wall 36 of the battery pack 24, is located in the region of the bend 68 on the side facing the battery pack 24. When the fastening element 38 has been suspended in the frame part 40, a tensioning force which acts in the transverse direction with respect to the main direction of travel of the industrial truck 10 is exerted on the battery pack 24 via the supporting region 70, with the result that said battery pack 24 is held securely in the battery accommodating compartment. In order that the securing bracket 28 can be matched for different battery pack sizes, it can comprise an in particular elastic adapter element 72 in the region of the supporting region 70, said adapter element 72 being in the form of a cylindrical plastic block or the like, for example. In order to be able to attach the adapter 72, the securing bracket 28 has a slot 74 in the lower section of the holding section 44, through which slot it is possible to screw through to the adapter 72 and by means of which slot the adapter 72 can be adjusted in the vertical direction along the holding section 44 corresponding to the battery pack used and to the vehicle type.

If the securing bracket 28 has been inserted with the lug 30 into the lower frame part 34, the supporting section 70 or the adapter 72 of said securing bracket 28 is in contact with the side wall 36 of the battery pack 24, which forms a type of support, which counteracts a further pivoting movement of the holding section 44 and of the fastening element 38 towards the battery pack per se. However, the bend 68 and/or the adapter 72 are selected in such a way that that part of the holding section 44 which is at the top can be deformed elastically in the direction of the battery pack by virtue of a manual force being applied to the actuating bracket 42 and can be suspended or latched in with the suspension section 56 on the frame part 40.

Figure 5:
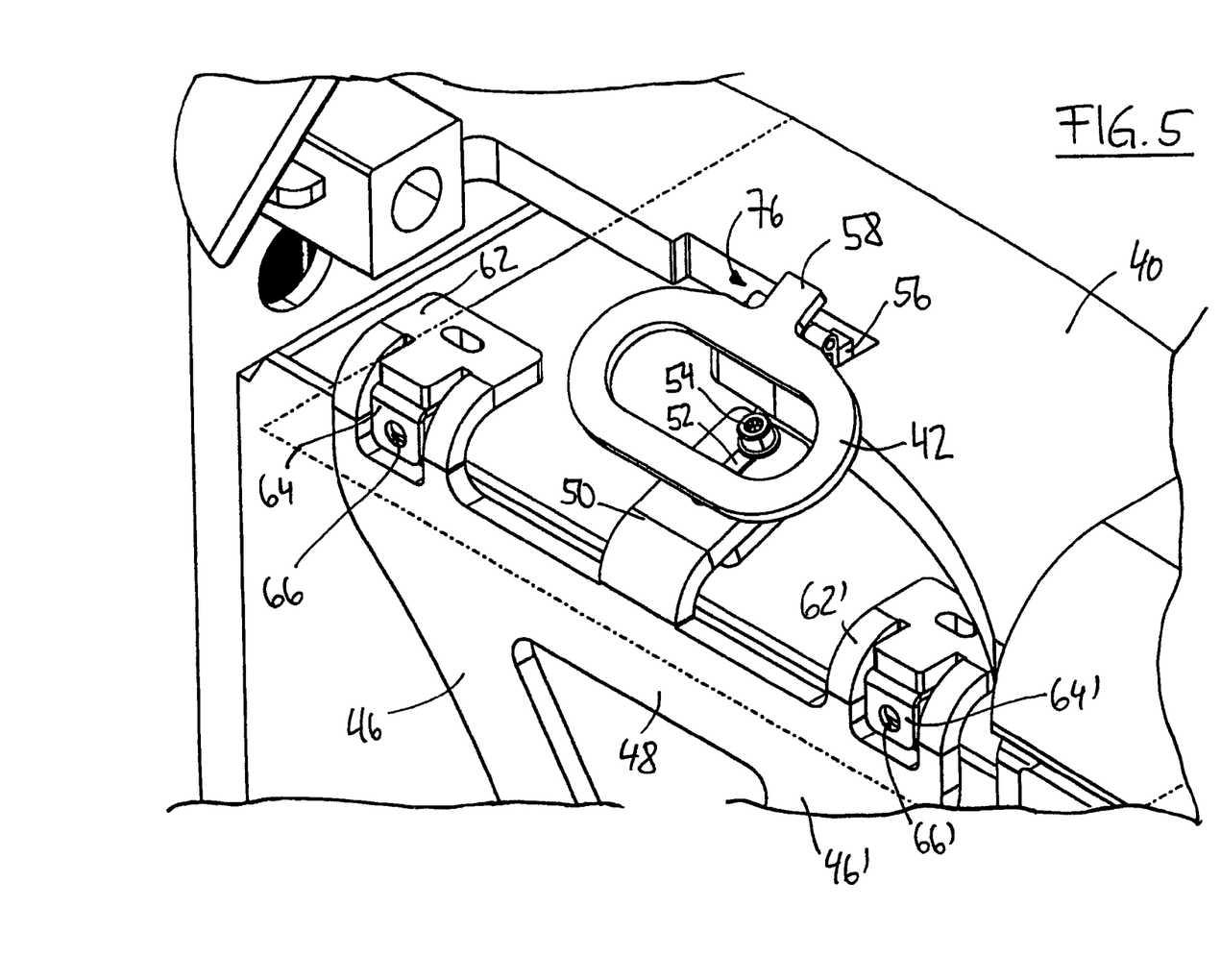
FIG. 5 shows an enlarged, schematic, detail illustration of the suspension of the securing bracket on the vehicle frame corresponding to the region indicated by V in FIG. 2.
Figure 6:
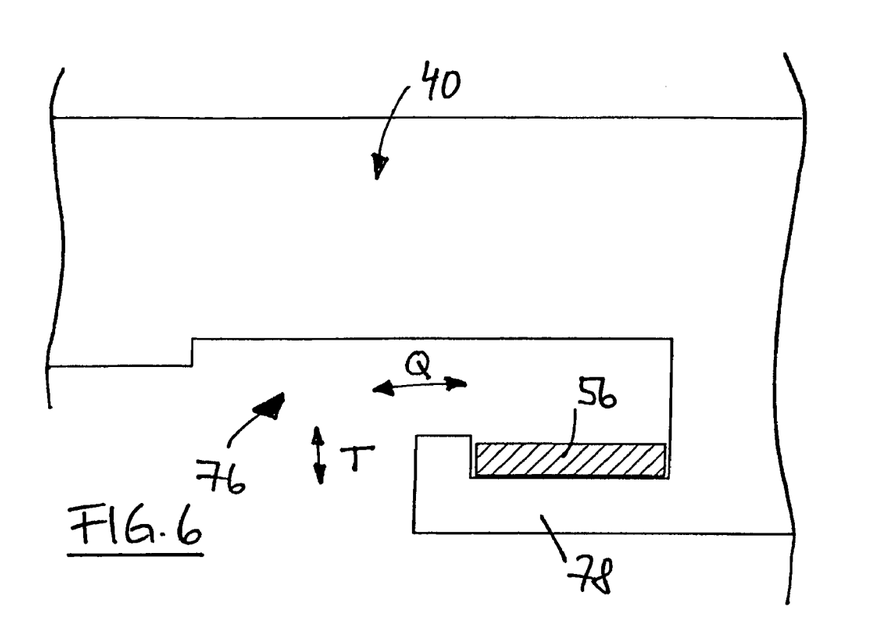
FIG. 6 shows a very simplified and schematic partial sectional illustration which explains the principle of the suspension of the securing bracket on the vehicle frame.

FIG. 5 shows an enlarged illustration of the suspension section 56 suspended on the upper frame part 40. A cutout 76 is provided in the frame element 40, as can also be seen from the very schematic partially sectional illustration in FIG. 6, and the fastening element 38, in particular the suspension section 56, can be introduced into said cutout 76. In this case, during suspension, the suspension section 56 can be introduced into the cutout 76 in the direction towards the battery pack initially to the left of a hook-like projection 78, with respect to FIG. 6, then moved in the transverse direction Q in the cutout 76 and suspended on the inner side of the hook element 78. In this securing position, which is illustrated schematically in FIG. 6, the suspension section 56 is pressed towards the hook 78 owing to the pretensioning forces which are acting, with the result that it cannot fall out of this securing position during normal driving operation of the industrial truck. In order to remove the securing bracket 28, the suspension section 56 needs to be moved away from the hook 78 in the depth direction T of the cutout 76 by the application of a manual force on the actuating bracket 42 counter to the effective pretension, and then moved towards the left in the transverse direction Q of the cutout 76 in relation to FIG. 6, in order that it can then be removed from the cutout 76 in the direction away from the frame element 40.

Figure 7:
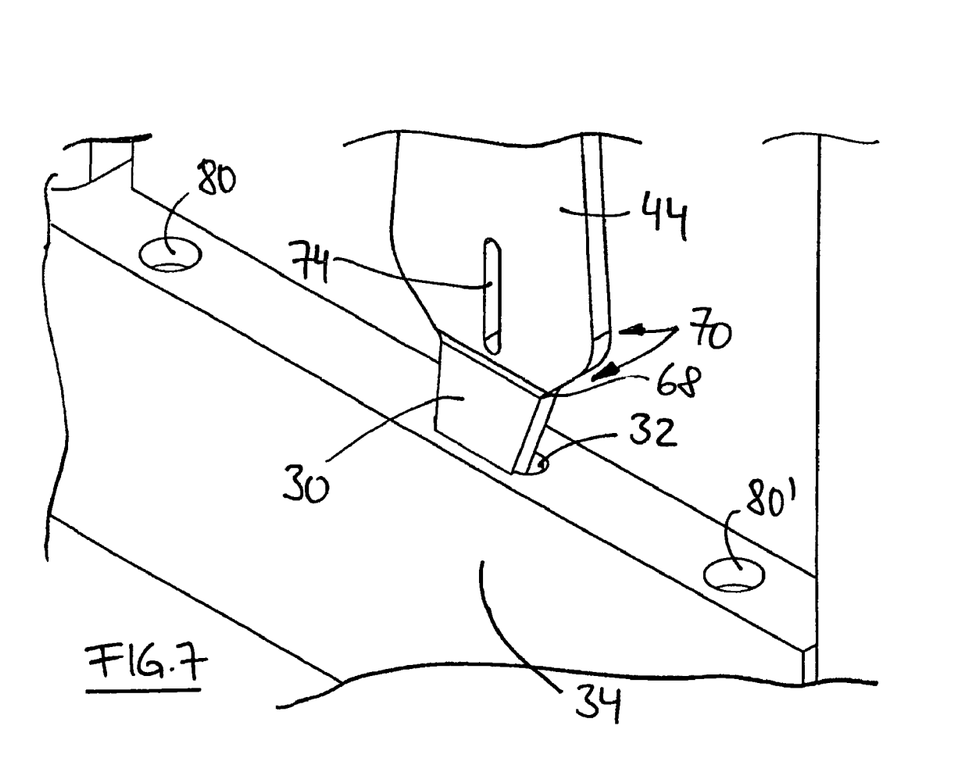
FIG. 7 shows an enlarged, perspective, partial illustration of a lower region of the securing bracket, which has been inserted into the vehicle frame in accordance with the region denoted by VII in FIG. 2.

FIG. 7 shows a very enlarged illustration of the lower frame part 34 with the receptacle or pocket 32 provided therein, into which receptacle or pocket the lug 30 of the securing bracket 28 has been introduced. In addition, this illustration also shows two openings 80, 80' in the frame part 34, in which openings the cover 22 can be inserted, as is illustrated in FIG. 8.

Figure 8:
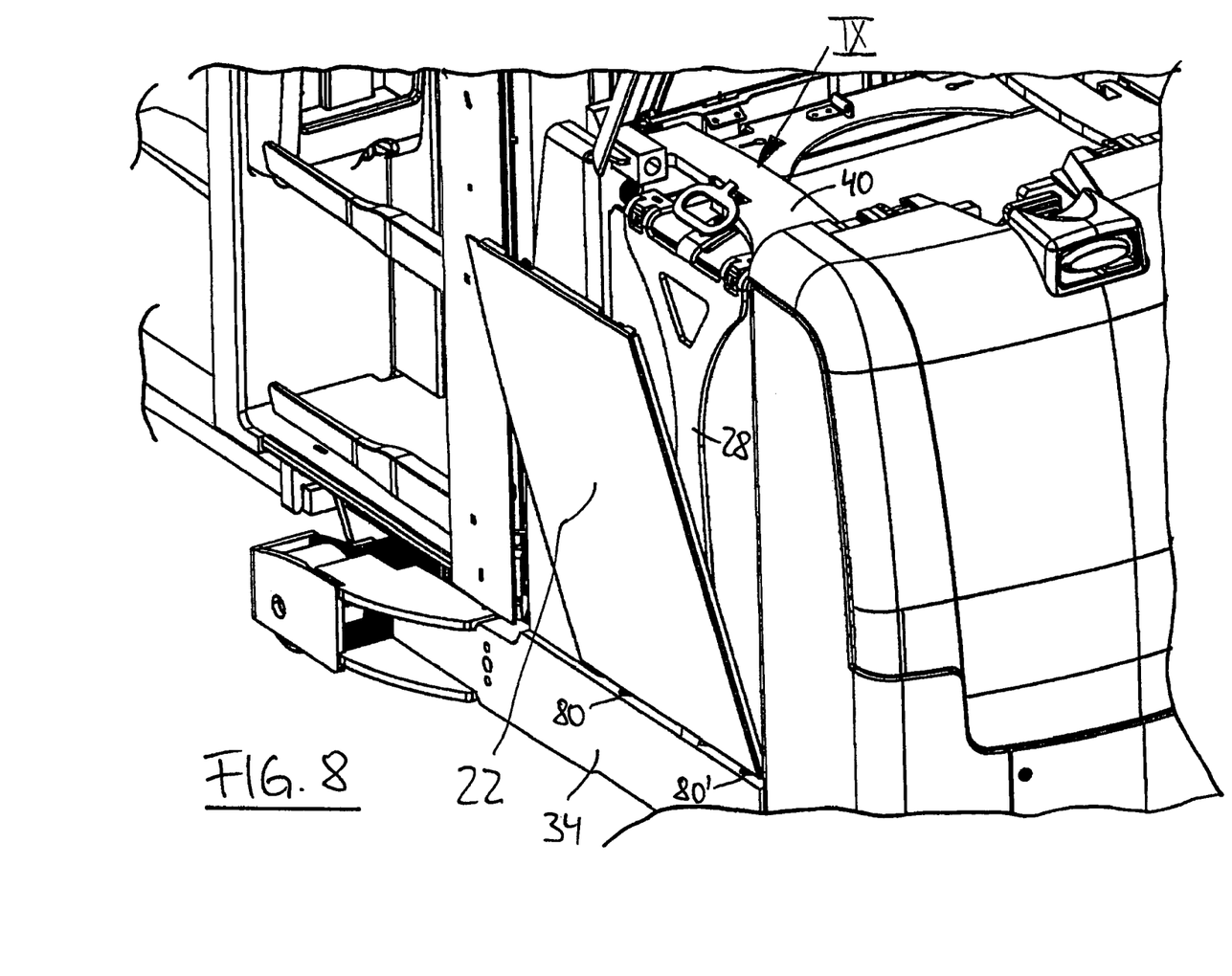
FIG. 8 shows a perspective, partial illustration with the cover for the battery compartment inserted but not yet closed.
Figure 9:
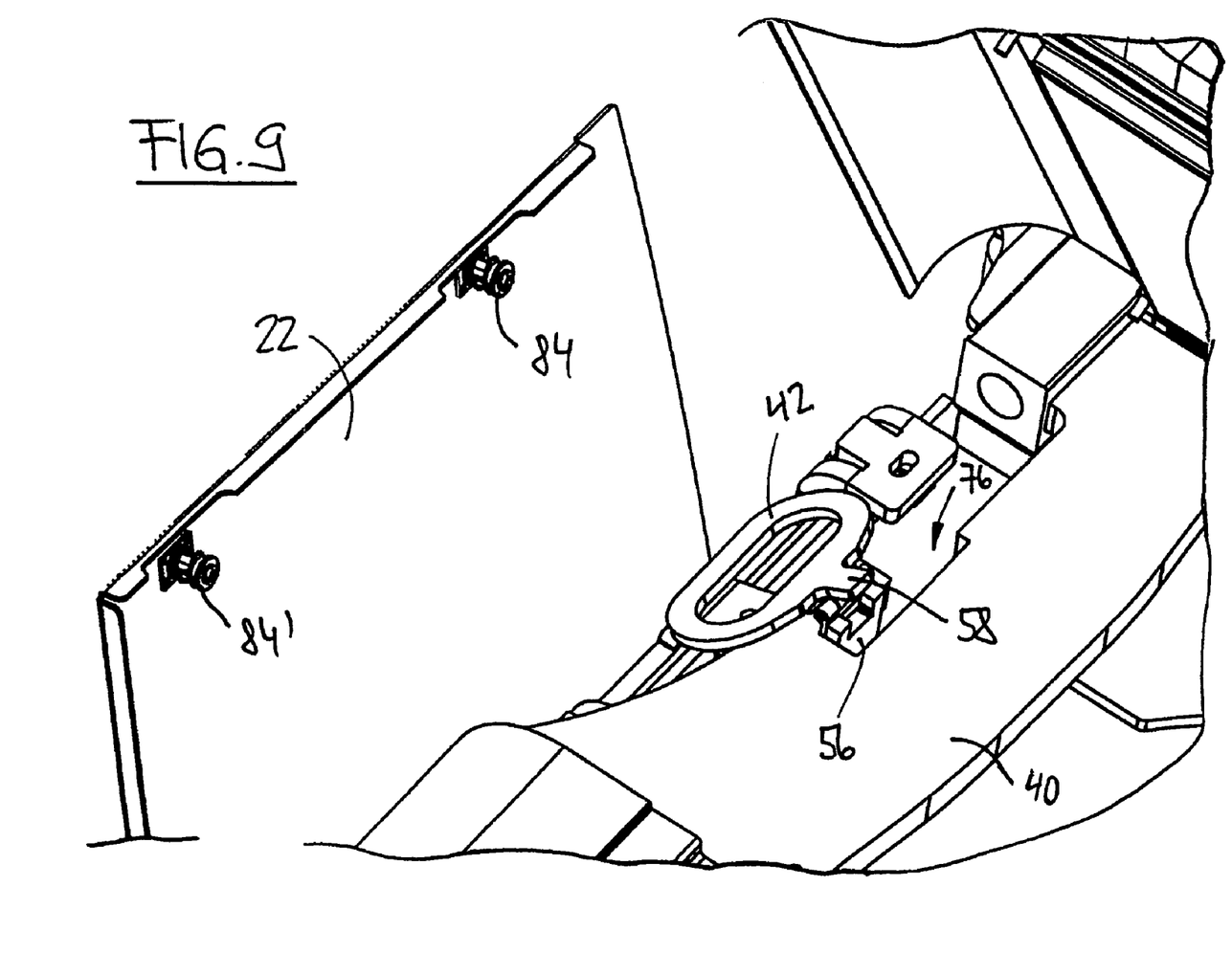
FIG. 9 shows an enlarged, perspective illustration corresponding to the arrow IX in FIG. 8.

If, in its securing position, the securing bracket 28 is suspended on the industrial truck 10, the cover 22, as shown in FIG. 8, is inserted into the openings 80, 80' in the lower frame part 34 and then pivoted in the direction towards the securing bracket 28. In this case, the cover 22 has fastening means 84, 84' on its side facing the securing bracket 28, which fastening means 84, 84' can engage in the openings 66, 66' in the L profiled pieces 64 attached to the securing bracket 28. For example, the fastening means 84, 84' can be in the form of closures, which are unlatched by a light pressure being exerted from the outside on the cover 22, with the result that additional handles or levers are not required on the outer side of the cover. Since the cover 22 is intended to be fastened on the securing bracket 28, it is possible to rule out the possibility of the cover 22 being capable of being attached without the securing bracket 28 being inserted correctly.

The proposed battery securing means by virtue of a tensioning bracket 28 requires only a small amount of physical space in the transverse direction with respect to the main direction of travel of the industrial truck 10, and the securing bracket 28 is accommodated in the interspace between the cover 22 and the battery side wall 26, in which no further components of the industrial truck are normally intended to be accommodated, with the result that the space available there per se can be used in optimum fashion for securing the battery. Since the securing bracket 28 is supported with a supporting region 70 or the adapter 72 very far towards the bottom on the battery pack 24, a particularly effective lever arm results, by virtue of which a high tensioning force can be exerted on the battery pack via the bracket 42, the fastening element 38 and the holding section 44 with a relatively small amount of manual force. This tensioning force which acts of the battery pack also results in the suspension section 56 and the lug 30 being pressed and supported against the frame parts 34 and 40 towards the outer side of the industrial truck, with the result that the securing bracket cannot be removed from its securing position during normal driving operation owing to, for example, a slight lateral movement of the battery pack. Since the securing bracket can be removed completely, there is also hardly any risk of damage to the securing bracket if a battery pack needs to be removed from the accommodating compartment for replacement or maintenance purposes.

For reasons of completeness, reference is also made to the fact that the correct attachment of the securing bracket can be monitored by a sensor (not illustrated in the figures). In addition, a securing bracket according to the invention can be used not only in the order picker shown in the figures, but also in all other types of industrial truck or electric vehicle.

The invention claimed is:

1. An electric vehicle, in particular an industrial truck comprising at least one securing bracket (28) for a battery pack (24) accommodated in the vehicle (10), the securing bracket (28) comprising an engagement section (30), which can be introduced into a first frame part (34) of the vehicle (10), a fastening element (38, 56), which can be suspended in a second frame part (40), and a holding section (44) which extends between said engagement section and said fastening element, the securing bracket (28), in a securing position in which it has been inserted in the vehicle (10), bearing with a supporting region (70) at least partially against the battery pack (24), and the supporting region (70) of the securing bracket being located in the region of the holding section (44) or in the region of the transition between the holding section (44) and the engagement section (30) and forming a support for the securing bracket (28) on the battery pack (24), in such a way that, when the engagement section (30) is introduced into the first frame part (34), the fastening element (38) can be suspended in the second frame part (40) with elastic deformation of the holding section (44).

2. The electric vehicle as claimed in claim 1, characterized in that the securing bracket (28) is designed in such a way that, in the securing position, it exerts a tensioning force which acts on the battery pack (24) in the supporting region (70).

3. The electric vehicle as claimed in claim 1, characterized in that the securing bracket (28) is designed in such a way that it can be brought out of engagement with at least one of the frame parts, preferably the second frame part (40), counter to the pretensioning force acting in the securing position.

4. The electric vehicle as claimed in claim 1, characterized in that, in the securing position, the securing bracket (28) extends in the substantially vertical direction from the first, lower frame part (34) to the second, upper frame part (40) of the vehicle (10), the lower and the upper frame part (34, 40) delimiting an opening in an accommodating compartment for the battery pack (24) in the vertical direction.

5. The electric vehicle as claimed in claim 1, characterized in that the engagement section is in the form of a lug (30), which is designed to be integral with the holding section (44).

6. The electric vehicle as claimed in claim 5, characterized in that the lug (30) is bent back with respect to the holding section (44), preferably in a direction away from the battery pack (24) with respect to the securing position.

7. The electric vehicle as claimed in one of claim 1, characterized in that the fastening element (38) is fastened adjustably on the holding section (44) in such a way that the distance between a section (56) of the fastening element (38), said section (56) being capable of being suspended in the second, upper frame part (40), and the holding section (44) is variable.

8. The electric vehicle as claimed in claim 7, characterized in that the fastening element (38) is arranged on a fastening tongue (50) of the holding section (44), the fastening tongue (50) protruding from the holding section (44) with respect to the securing position in the direction of the battery pack (24).

9. The electric vehicle as claimed in claim 8, characterized in that the fastening tongue (50) and/or the fastening element (38) have a slot (52), through which a screw arrangement (54), in particular a screw-and-nut arrangement, which connects the fastening tongue (50) and the fastening element (38)

to one another, passes and which is designed in such a way that the fastening element (38) is adjustable along the fastening tongue (50) when the screw arrangement has been released.

10. The electric vehicle as claimed in claim 7, characterized in that the suspendable section (56) of the fastening element (38) extends in the substantially vertical direction in the securing position.

11. The electric vehicle as claimed in claim 10, characterized in that the suspendable section (56) can be introduced into a cutout (76) in the second, upper frame part (40), and in the securing position, engages behind a hook-like projection (78), which delimits the cutout (76) on one side.

12. The electric vehicle as claimed in claim 11, characterized in that a distance between the screw arrangement (54) and the underside of the second, upper frame part (40) is selected in such a way that no, or only a slight, vertical movement of the securing bracket is made possible.

13. The electric vehicle as claimed in claim 1, characterized in that the securing bracket (28) comprises, on the side thereof which faces the battery pack in the securing position, an in particular elastic adapter element (72) which is in contact with the battery pack (24).

14. The electric vehicle as claimed in claim 13, characterized in that the adapter element (72) is fastened releasably on the holding section (44) above the lower engagement section (30).

15. The electric vehicle as claimed in claim 14, characterized in that the adapter element (72) is fastened adjustably by a screw arrangement, which extends through a slot (74) formed in the holding section (44).

16. The electric vehicle as claimed in claim 13, characterized in that the adapter element (72) forms the supporting region (70) of the securing bracket (28) on the battery pack.

17. The electric vehicle as claimed in claim 1, characterized in that the fastening element (38) has an in particular pivotable actuating handle (42).

18. The electric vehicle as claimed in claim 17, characterized in that the actuating handle (24) can be pivoted between an actuating position and a rest position.

19. The electric vehicle as claimed in claim 1, characterized in that the holding section (44) has a Y shape, with the two upper limbs (46, 46') of the holding section (44) being connected to one another by a transversely running web (48), on which the fastening element (38) is supported.

20. The electric vehicle as claimed in claim 1, characterized in that the securing bracket (28) is designed in such a way that a cover (22) of an accommodating compartment for the battery pack (24) can be fastened on the securing bracket (28).

21. The electric vehicle as claimed in claim 20, characterized in that the cover (22) can be fastened, in the region of the lower edge thereof, in the first, lower frame part (34) and can be fastened, in the region of the upper edge thereof, on the securing bracket (28).

22. The electric vehicle as claimed in claim 19, characterized in that the two upper limbs (46, 46') of the holding section (44) are each bent toward the battery pack (24) with respect to the securing position and comprise accommodating means (64, 64') for fastening a cover (22).

23. The electric vehicle as claimed in claim 1, characterized in that it comprises a sensor, by means of which the presence or the correct attachment of the at least one securing bracket in the securing position can be verified.

24. The electric vehicle as claimed in claim 23, characterized in that the sensor transmits a corresponding battery secure signal to an electronic control unit of the electric vehicle, with the result that information relating to the battery secure state can be output by the control unit by means of an associated, in particular optical and/or acoustic interface.

25. The electric vehicle as claimed in claim 1, characterized in that it comprises two securing brackets, with one securing bracket being attachable or attached to each side of an accommodating compartment for a battery pack.

\* \* \* \* \*